(12) United States Patent
Liu et al.

(10) Patent No.: US 8,899,124 B2
(45) Date of Patent: Dec. 2, 2014

(54) INDUSTRIAL ROBOT

(75) Inventors: Zhen-Xing Liu, Shenzhen (CN);
Xiao-Ming Xu, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 268 days.

(21) Appl. No.: 13/437,121

(22) Filed: Apr. 2, 2012

(65) Prior Publication Data

US 2013/0042714 A1  Feb. 21, 2013

(30) Foreign Application Priority Data

Aug. 17, 2011  (CN) .......................... 2011 1 0236051

(51) Int. Cl.
*B25J 17/00* (2006.01)
*B25J 9/00* (2006.01)

(52) U.S. Cl.
CPC .............. *B25J 9/0051* (2013.01); *Y10S 901/14* (2013.01)
USPC ................... 74/490.01; 74/490.02; 74/490.05; 901/14

(58) Field of Classification Search
USPC ............... 74/490.01, 490.02, 490.03, 490.05; 901/50, 14
See application file for complete search history.

(56) References Cited

U.S. PATENT DOCUMENTS

| 7,331,253 B2 * | 2/2008 | Burkert et al. ............. 74/490.01 |
| 8,210,068 B2 * | 7/2012 | Feng .......................... 74/490.05 |

FOREIGN PATENT DOCUMENTS

| CN | 201752888 U | 3/2011 |
| CN | 102049786 A | 5/2011 |

* cited by examiner

*Primary Examiner* — William C Joyce
(74) *Attorney, Agent, or Firm* — Novak Druce Connolly Bove + Quigg LLP

(57) ABSTRACT

An industrial robot includes a support body, a moving platform, a pivot shaft, a plurality of driving devices, a plurality of transfer branch joints, and a base. The support body includes a main body, and an installing portion opposite to the main body; the pivot shaft is rotatably connected with the main body and the moving platform; the driving devices are positioned at a bottom of the main body; each transfer branch joint is movably connected with the moving platform and one corresponding driving device; the installing base includes a bottom base, and two supporting arms extending from opposite sides of the bottom base; the bottom base and the two supporting arms cooperatively forming a receiving space; the bottom base and the two supporting arms are detachable in relation to the installing portion and the main body; the main body is received in the receiving space.

12 Claims, 6 Drawing Sheets

INDUSTRIAL ROBOT

BACKGROUND

1. Technical Field

The present disclosure relates to an industrial robot having a detachably installing base.

2. Description of Related Art

Industrial robots are used in manufacturing for high precision benefits. In use, the robots need to be assembled in different environments. However, current assembly methods of industrial robots are usually complex. That, it is inconvenient to assemble or dissemble the industrial robot.

Therefore, there is room for improvement within the art.

DETAILED DESCRIPTION

Figure 1:
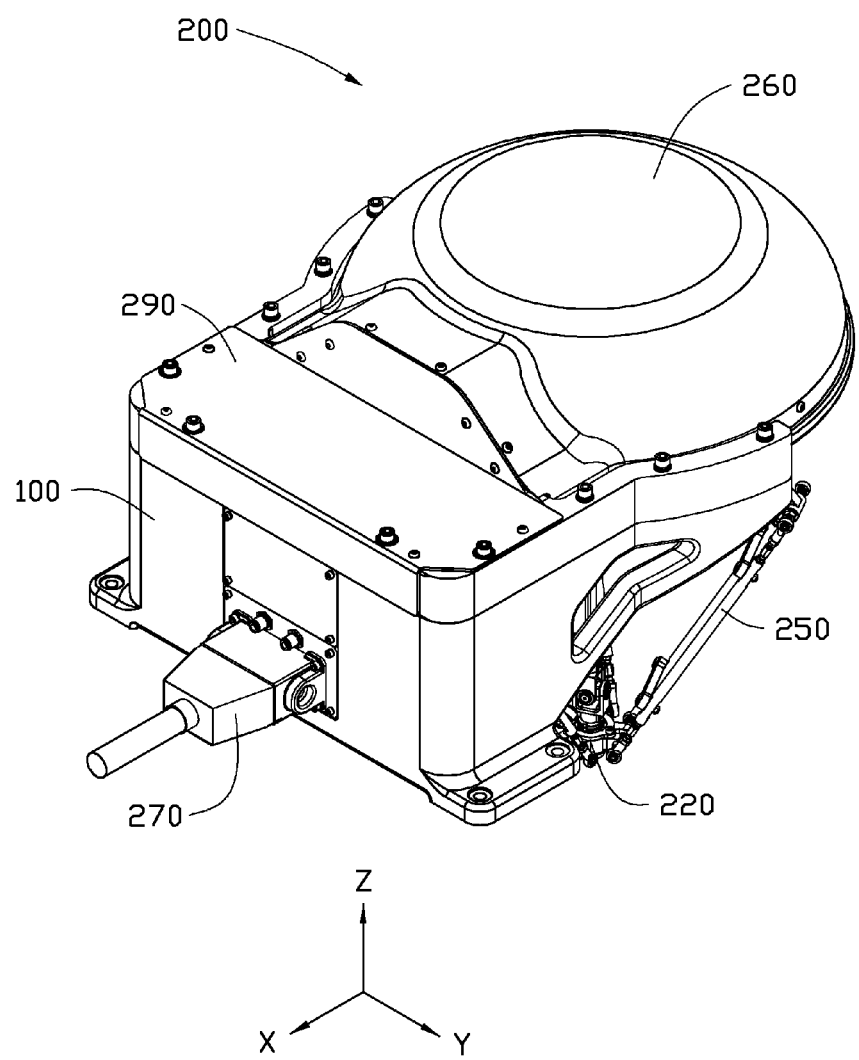
FIG. 1 is an isometric view of an industrial robot in a first embodiment.
Figure 2:
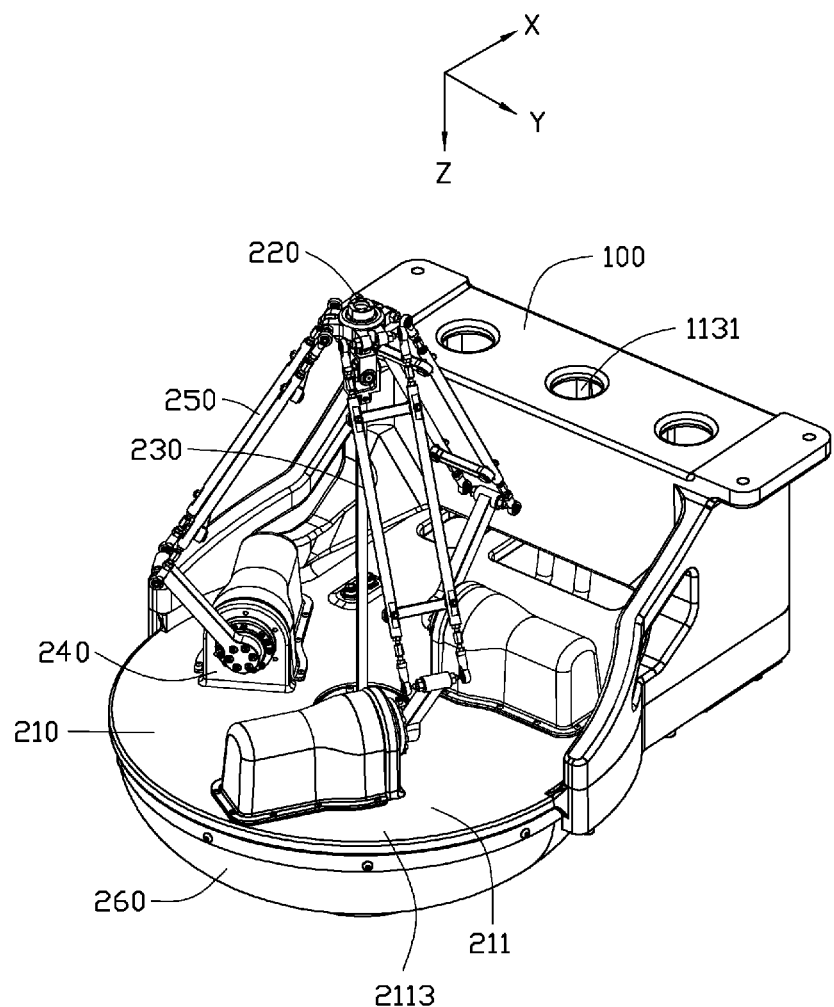
FIG. 2 is an reversed view of the industrial robot of FIG. 1.

Referring to FIGS. 1 and 2, a first embodiment of an industrial robot 200 used for transferring, handling, or discharging workpieces is shown. The industrial robot 200 includes an installing base 100, a support body 210, a moving platform 220, a pivot shaft 230, three driving devices 240, three transfer branch joints 250, a top cover 260, a plug module 270, and a cover body 290. The support body 210 is assembled with the installing base 100. The pivot shaft 230 is rotatably connected with the support body 210 and the moving platform 220. Three driving devices 240 around the pivot shaft 230 are assembled on a bottom of the support body 210. Each transfer branch joint 250 is movably connected to the moving platform 220 and each one transfer branch joint 250 corresponds to one driving device 240. The top cover 260 is detachably positioned on a top of the support body 210. The plug module 270 is assembled with the support body 210 and is configured to conduct electrical power to the three driving devices 240. The cover body 290 is positioned on the support body 210 for protecting the industrial robot 200. The pivot shaft 230 is driven to rotate by a motor (not shown) or other driving device. The three transfer branch joints 250 can be independently driven by the three driving devices 240, respectively, for driving the moving platform 220 to move along X-axis, Y-axis and Z-axis.

Figure 3:
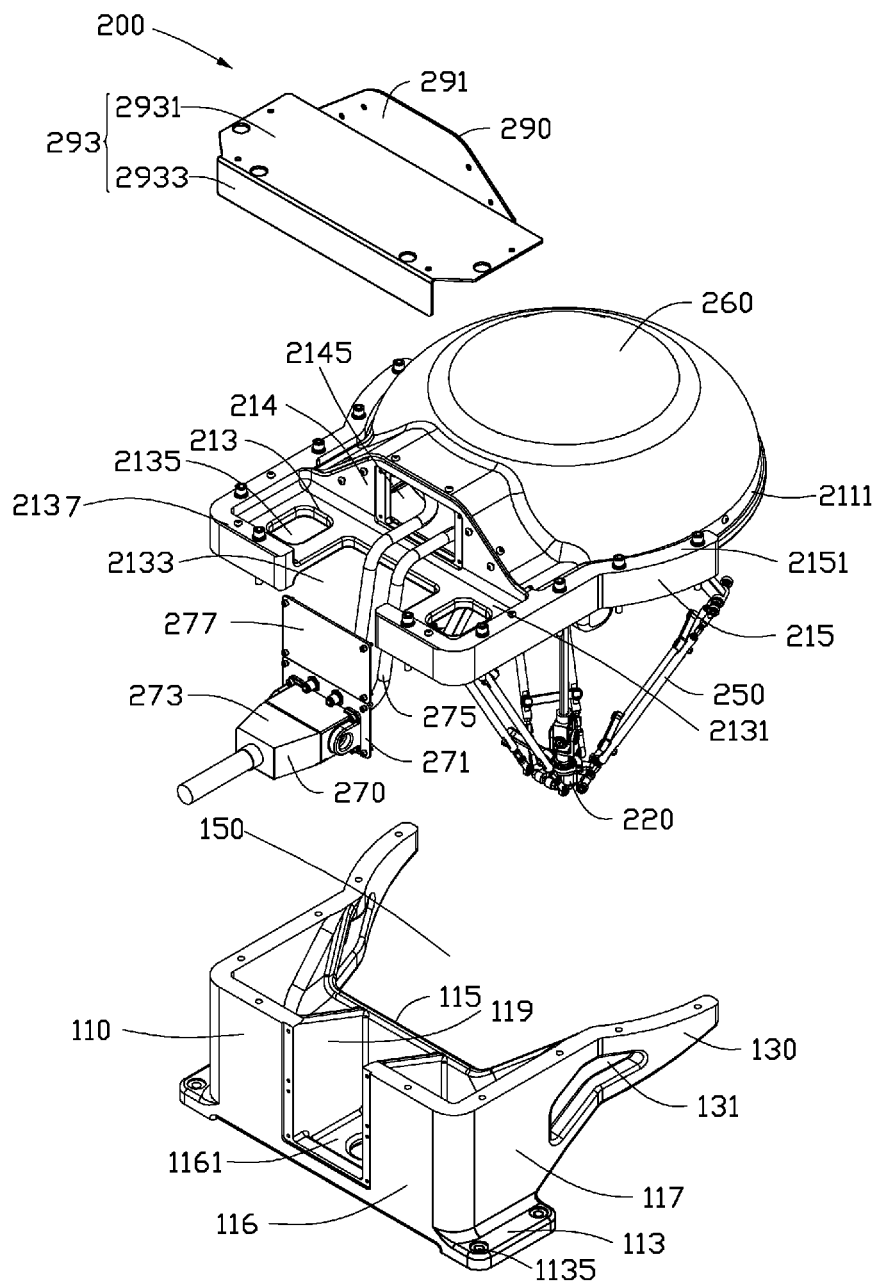
FIG. 3 is an isometric and exploded view of the industrial robot of FIG. 1.
Figure 4:
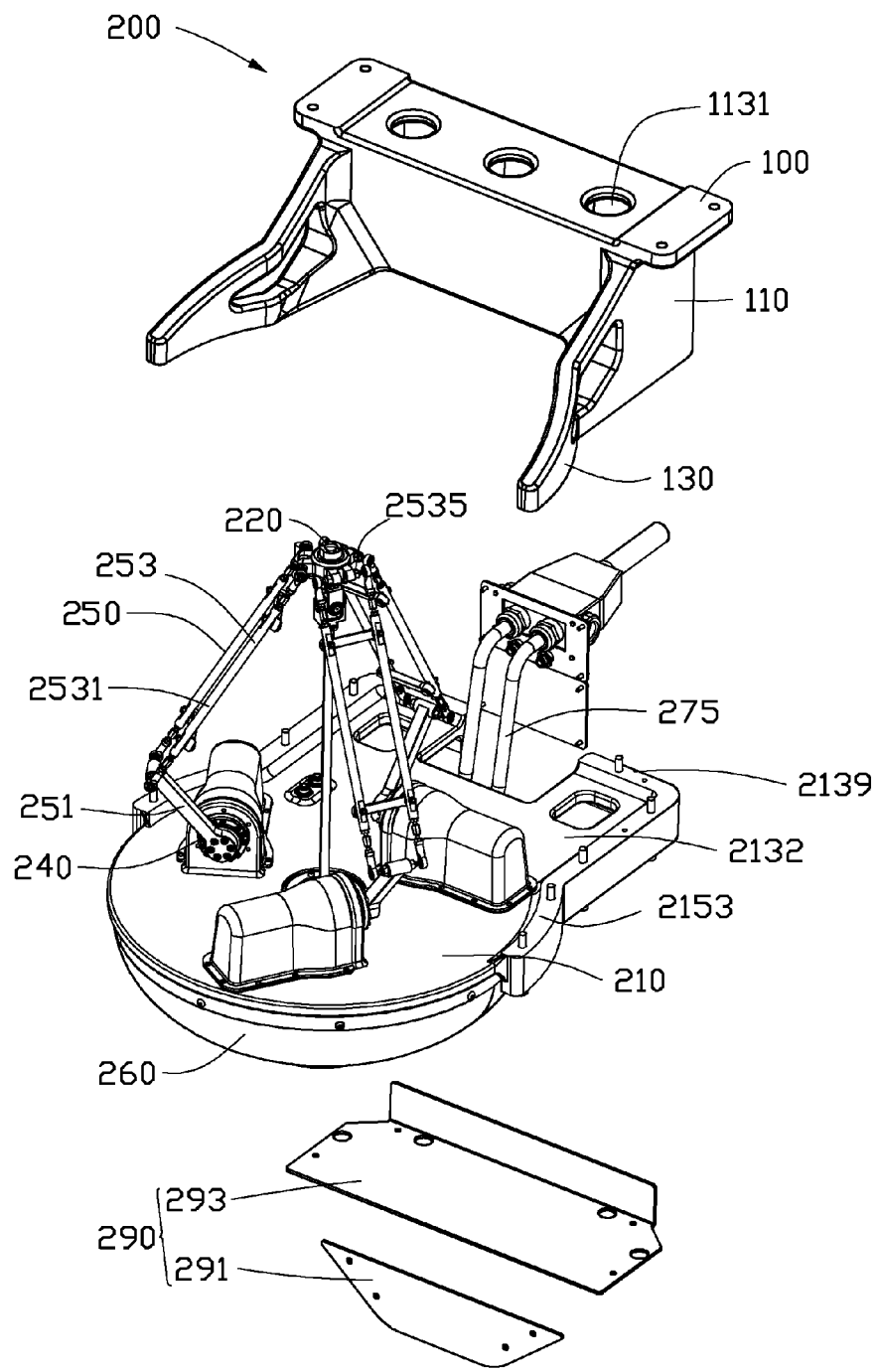
FIG. 4 is an isometric and exploded view of the industrial robot of FIG. 2.

Referring also to FIGS. 3 and 4, the installing base 100 includes a bottom base 110 and two supporting arms 130 extending from opposite sides of the bottom base 110. The bottom base 110 is a rectangular frame. The bottom base 110 includes a bottom board 113, a first supporting board 115, a second supporting board 116, and two end walls 117. Several round holes 1131 are defined through the bottom board 113 for lightness. Two fixing holes 1135 are formed at opposite ends of the bottom board 113 for fixing the installing base 100 to a work table (not shown). The first supporting board 115 and the second supporting board 116 are parallelly configured on two edges of the bottom board 113. The two end walls 117 adjacent to the fixing holes 1135 are also parallel, and extending from the bottom board 113. Each end wall 117 interconnects with the first supporting board 115 and the second supporting board 116.

A wiring groove 1161 is defined in the middle of the second supporting board 116. Two baffle plates 119 extend from the opposite sides of the wiring groove 1161 and connect to the first supporting board 115. Each supporting arm 130 extends from one corresponding end wall 117 and connects with the first supporting board 115. Two supporting arms 130 cooperatively form a receiving space 150 for receiving the support body 210. In the illustrated embodiment, one end of the supporting arm 130 away from the end wall 117 has a curved profile. In the illustrated embodiment, a size of the supporting arms 130 decreases gradually from an end adjoining the bottom base 110 to another end thereof. A penetrating hole 131 is defined in each of the supporting arms 130 for lightness.

The support body 210 includes a main body 211 (see FIG. 2), an installing portion 213 opposite to the main body 211, a connecting board 214, and two mounting portions 215. The main body 211 is substantially circular, including a top surface 2111 and a bottom surface 2113 opposite to the top surface 2111. The installing portion 213 includes a first installing surface 2131 and a second installing surface 2132 opposite to the first installing surface 2131. The second installing surface 2132 is adjacent to the bottom surface 2113. An U-shaped injecting groove 2133 is defined through the installing portion 213 corresponding to the wiring groove 1161. Two rectangular recessing chambers 2135 are formed in the first installing surface 2131 and the second installing surface 2132, respectively. A first sidewall 2137 is formed at edges of the first installing surface 2131, and the second sidewall 2139 is formed at edges of the second installing surface 2132 thereof. In the illustrated embodiment, the second sidewall 2139 is fixed to the bottom base 113.

The connecting board 214 is substantially sloped. The connecting board 214 is positioned perpendicular to the joint of the main body 211 and the installing portion 213. A connecting hole 2145 is defined in the middle of the connecting board 214. The two mounting portions 215 are positioned outwards on part of opposite sides of the main body 211, and are connected with the installing portion 213. Each mounting portion 215 includes a first connecting surface 2151 and a second connecting surface 2153 opposite to the first connecting surface 2151. The second connecting surface 2153 is also adjacent to the bottom surface 2113 and connects with the two supporting arms 130.

The pivot shaft 230 is rotatably connected with the bottom surface 2113 and the moving platform 220. The three driving devices 240 are positioned around the pivot shaft 230 and separately arranged on the bottom surface 2113. In the illustrated embodiment, the three driving devices 240 are motors.

Each transfer branch joint 250 movably connects with the moving platform 220 and can be acted upon by one driving device 240. Each transfer branch joint 250 includes a swing arm 251 and a linkage 253 connected with the swing arm 251. One swing arm 251 is movably connects with corresponding one driving device 240. The linkage 253 is away from the driving device 240. The linkage 253 includes two parallel connecting bars 2531 and four joint members 2535. The connecting bars 2531 are rotatably connected with the swing arm 251 and the moving platform 220 via the four joint members 2535.

The top cover 260 covers the top surface 2111. A receiving room (not shown) is formed between the top cover 260 and the top surface 2111 for receiving driving mechanisms (not shown) used for driving the pivot shaft 230.

The plug module 270 includes a mounting board 271, a plug 273, two cables 275 and an installing board 277. The mounting board 271 is installed on the wiring groove 1161 adjoining the bottom base 113. The plug 273 is positioned at the mounting board 271 and is conductively connected with each of the cable 275. Each cable 275 passes through the injecting groove 2133 and the connecting hole 2145. The installing board 277 is mounted on the wiring groove 1161 away from the bottom base 113 for sealing the wiring groove 1161.

The cover body 290 is detachable and assembled to the installing portion 213 and the connecting board 214. The cover body 290 includes a first cover board 291 and a second cover board 293. The first cover board 291 covers the connecting board 214. In the illustrated embodiment, a shape of the first cover board 291 is similar to that of the connecting board 214; a height of the first cover board 291 is smaller than that of the first cover board 291. The second cover board 293 includes a basing body 2931 and a bending portion 2933 extending substantially perpendicularly from one side of the basing body 2931. The basing body 2931 covers the first installing surface 2131. The basing body 2931 is fixed to the first sidewall 2137. The bending portion 2933 covers an outer sidewall of the installing portion 213.

In assembly, the pivot shaft 230, the three driving devices 240, the three transfer branch joints 250, the top cover 260, and the cover body 290 are assembled to the support body 210. The moving platform 220 connects with the pivot shaft 230 and the three transfer branch joints 250. The second installing surface 2132 and the second connecting surface 2153 of the support body 210 are respectively assembled to the bottom base 113 and the two supporting arms 130 together. The first cover board 291 covers the connecting board 214. The second cover body 293 is fixed to the first sidewall 2137 to cover the first installing surface 2131.

Figure 5:
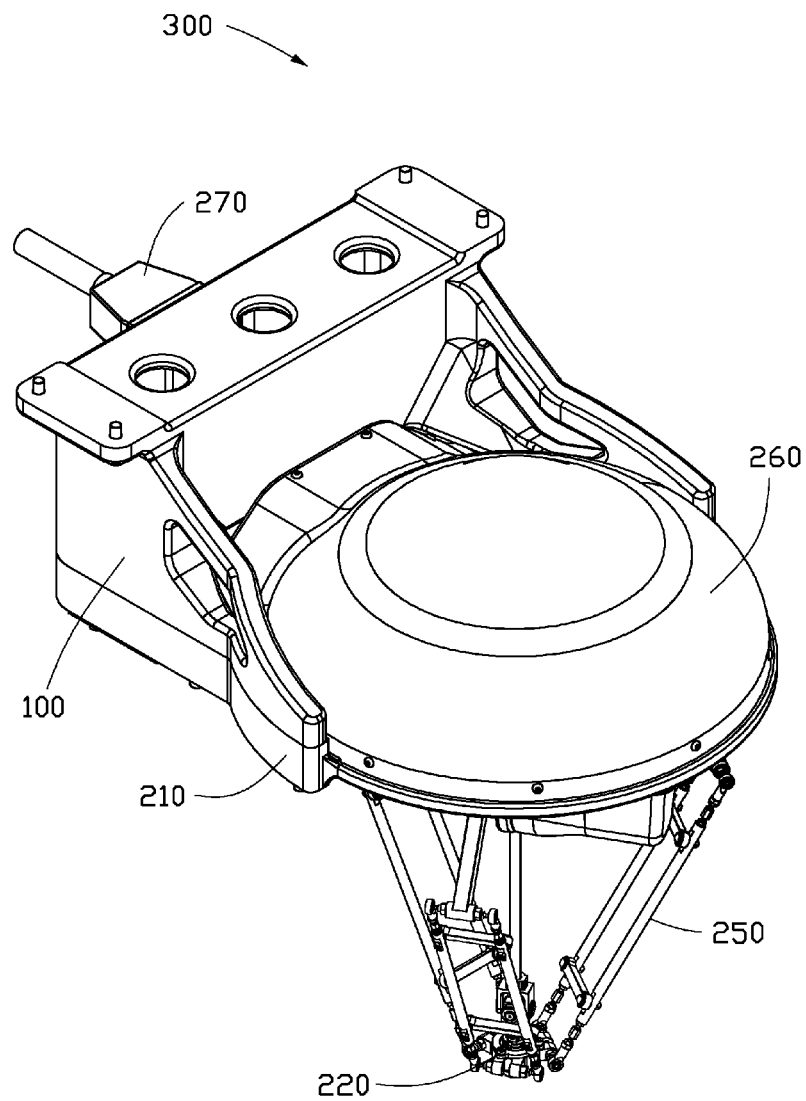
FIG. 5 is an isometric view of an industrial robot in a second embodiment
Figure 6:
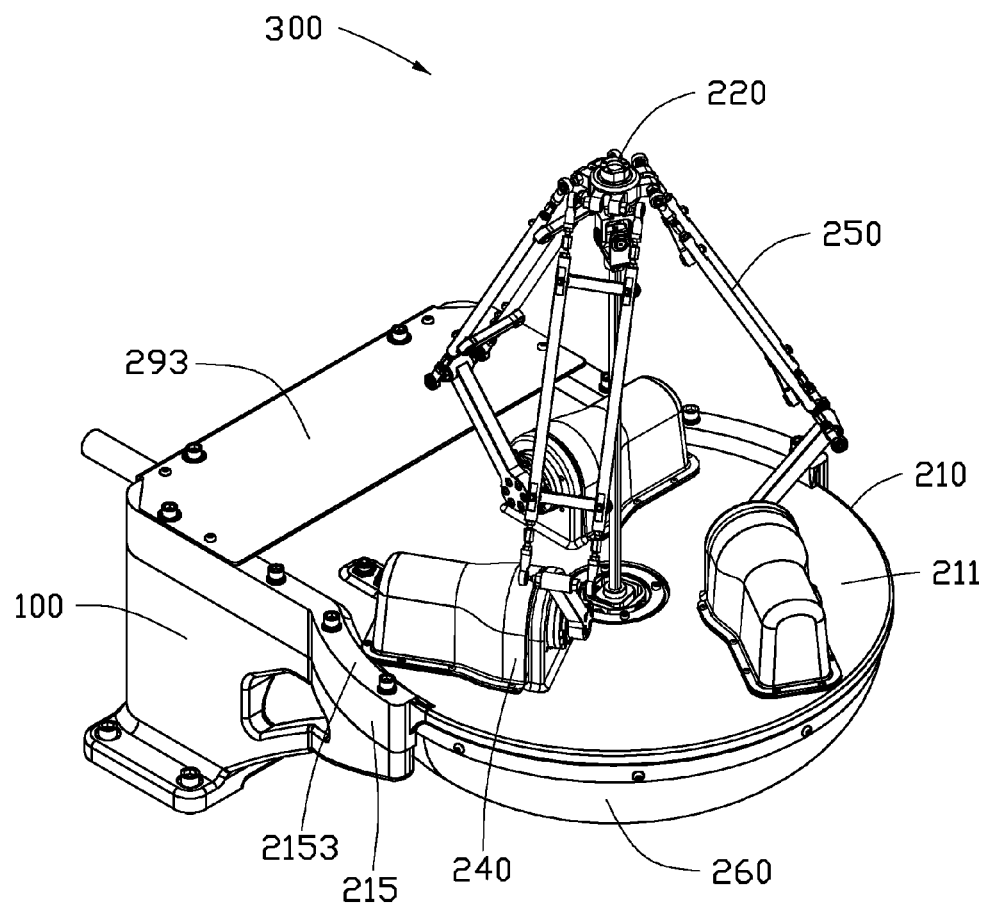
FIG. 6 is an reversed view of the industrial robot of FIG. 5.

Referring also to FIGS. 5 and 6, a second embodiment of the industrial robot 300 is shown, which is similar to the industrial robot 200 of the first embodiment, except that the installing base 100 is reversely assembled with the installing portion 213 of the support body 210. In the illustrated embodiment, the installing base 100 is positioned corresponding to the first installing surface 2131. The first sidewall 2137 is fixed to the bottom base 113; the first connecting surface 2151 connects with the two supporting arms 130, and the second cover board 293 is mounted on the second side wall 2139 to cover the second installing surface 2132.

The industrial robot 200 has a detachable installing base 100. The installing base 100 has a simple structure. It is far less inconvenient to assemble or disassemble the industrial robot 200 in different environments. In addition, the user can choose at least one installation method from, for example, one of the two embodiments according to the needs or requirements under the proposed environment, which is an additional benefit compared with the industrial robots of related art.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An industrial robot, comprising:
   a support body comprising:
      a main body, and
      an installing portion opposite to the main body;
   a moving platform;
   a pivot shaft rotatably connected with the main body and the moving platform;
   a plurality of driving devices assembled on the main body around the pivot shaft;
   a plurality of transfer branch joints, and each one of the plurality of transfer branch joints movably connected with the moving platform and the each one transfer branch joint corresponding to one driving device;
   an installing base detachably assembled with the support body, comprising:
      a bottom base comprising a bottom board and two end walls positioned oppositely at the bottom board; and
      two supporting arms, each supporting arm extending from one corresponding end wall; the two supporting arms cooperatively forming a receiving space; the bottom base and the two supporting arms detachably assembled with the installing portion and the main body respectively, and the main body received in the receiving space, wherein the installing base can be assembled with the installing portion in a first configuration and assembled in a second reverse configuration, when the installing base is assembled with the installing portion in the first configuration, the bottom board and the moving platform are positioned at a same side of the installing portion; when the installing base is assembled with the installing portion in the second reverse configuration, the bottom board and the moving platform are positioned at opposite sides of the installing portion.

2. The industrial robot of claim 1, wherein the support body further comprises two mounting portions positioned outwards on part of opposite sides of the main body, the two mounting portions connect with the installing portion, the two supporting arms are respectively connected with the two mounting portions, and the two end walls are connected with the installing portion.

3. The industrial robot of claim 2, wherein the mounting portion comprises a first connecting surface and a second connecting surface positioned opposite to the first connecting surface; the two supporting arms are respectively connected with the second connecting surface; the installing portion comprises a first installing surface and a second installing surface positioned opposite to the first installing surface; the bottom base connects with the first installing surface when the installing base is assembled with the installing portion.

4. The industrial robot of claim 2, wherein the mounting portion comprises a first connecting surface and a second connecting surface positioned opposite to the first connecting surface; the two supporting arms are respectively connected with the second connecting surface; the installing portion comprises a first installing surface and a second installing surface positioned opposite to the first installing surface; the bottom base connects with the second installing surface when the installing base is reversely assembled with the installing portion.

5. The industrial robot of claim 1, wherein the industrial robot further comprises a plug module configured for conducting electrical power to the plurality of driving devices, the bottom base further comprises a first supporting board and a second supporting board, the first supporting board and the second supporting board are positioned oppositely on the bottom board and connect with the two end walls; the second supporting board connects with the installing portion, a wiring groove is defined in the second supporting board, and the plug module is mounted on the wiring groove.

6. The industrial robot of claim 5, wherein an injecting groove is defined in the installing portion corresponding to the wiring groove.

7. The industrial robot of claim 5, wherein two baffle plates are extendedly formed from the two sides of the second supporting board and connect to the first supporting board.

8. The industrial robot of claim 1, wherein each one of the plurality of transfer branch joint comprises a swing arm and a linkage connected with the swing arm; one swing arm is movably connects with corresponding one driving device; the linkage is away from the driving device; the linkage connects the swing arm and the moving platform.

9. The industrial robot of claim 8, wherein the linkage comprises two parallel connecting bars and four joint members; the two connecting bars are rotatably connected with the swing arm and the moving platform via the four joint members.

10. The industrial robot of claim 1, wherein the support body further comprises a connecting board positioned at the joint of the main body and the installing portion.

11. The industrial robot of claim 10, wherein the industrial robot further comprises a cover assembly detachably assembled with the installing portion, the cover assembly comprises a first cover board covering the connecting board and a second cover board covering the installing portion.

12. The industrial robot of claim 11, wherein the second cover board comprises a basing body and a bending portion extending perpendicular from one side of the basing body, the basing body covers and is fixed with the installing portion, the bending portion covers and wraps on the side walls of the installing portion.

* * * * *